United States Patent
Perrone et al.

(10) Patent No.: US 6,626,705 B2
(45) Date of Patent: Sep. 30, 2003

(54) JACK MODULE

(75) Inventors: Francesco Perrone, Thalwil (CH); Ryan L. Lindquist, Shakopee, MN (US); Jarrod C. Scadden, Shakopee, MN (US); Dominic L. Louwagie, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/904,582

(22) Filed: Jul. 13, 2001

(65) Prior Publication Data

US 2003/0013346 A1 Jan. 16, 2003

(51) Int. Cl.⁷ .............................................. H01R 24/04
(52) U.S. Cl. ...................................................... 439/668
(58) Field of Search ................................. 439/668, 669, 439/188

(56) References Cited

U.S. PATENT DOCUMENTS

| | | | |
|---|---|---|---|
| 4,768,961 A | * 9/1988 | Lau | 361/800 |
| 4,797,114 A | * 1/1989 | Lau | 439/668 |
| 5,233,501 A | * 8/1993 | Allen et al. | 200/51.04 |
| 5,413,494 A | * 5/1995 | Dewey et al. | 439/668 |
| 5,582,525 A | * 12/1996 | Louwagie et al. | 439/188 |
| 5,685,741 A | * 11/1997 | Dewey et al. | 439/668 |
| 5,879,197 A | 3/1999 | Dewey | 439/668 |
| 5,913,701 A | * 6/1999 | Olson et al. | 439/668 |
| 5,938,478 A | 8/1999 | Werner | 439/668 |
| 6,116,961 A | 9/2000 | Henneberger et al. | 439/668 |

FOREIGN PATENT DOCUMENTS

| | | |
|---|---|---|
| WO | WO 94/08429 | 10/1993 |
| WO | WO 96/38884 | 12/1996 |
| WO | WO 00/60704 | 3/2000 |

OTHER PUBLICATIONS

"E1 64 Circuit Panel. Telect Part No: E64–5000–1100", http://www.telect.com/index.cfm?, Telect, 3 pages (Jun. 13, 2001).

"E1 64 Circuit Panel. Telect Part No: E64–5000–1200", http://www.telect.com/index.cfm?, Telect, 3 pages, (Jun. 13, 2001).

"RJ45 Chassis Assembly Installation Drawing", ADC, Catalog No. DFX–120001, 2 pages (Sep. 28, 2000).

* cited by examiner

Primary Examiner—Tulsidas Patel
(74) Attorney, Agent, or Firm—Merchant & Gould P.C.

(57) ABSTRACT

A jack module sized to occupy only a portion of a telecommunications chassis. The jack module includes a front jack mount, a plurality of jacks and a rear connector mount. The rear connector mount supports a plurality of connectors. The connectors include housings defining ports for receiving plugs. In certain embodiments, the connectors can include RJ-45 connectors.

37 Claims, 15 Drawing Sheets

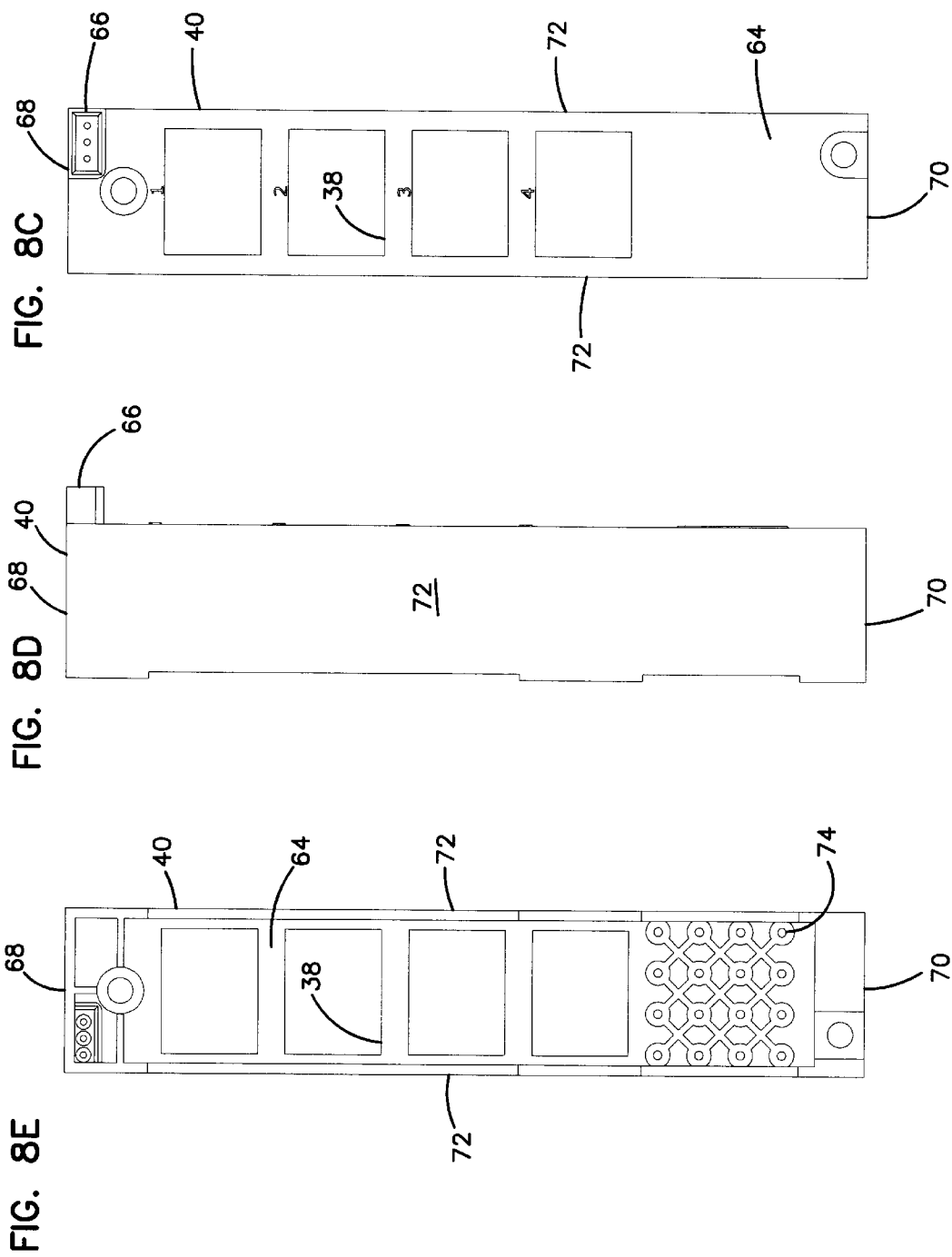

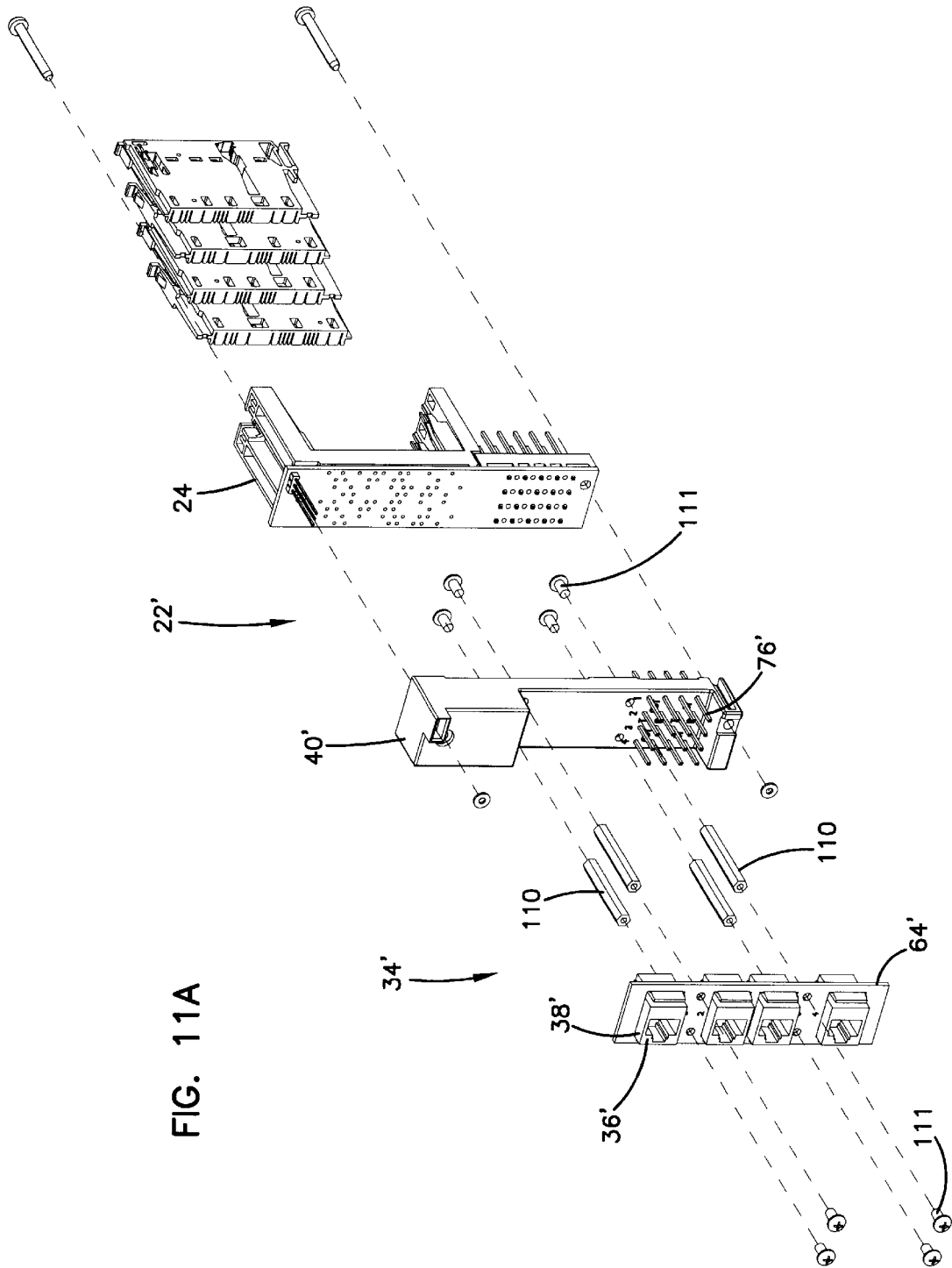

JACK MODULE

FIELD OF THE INVENTION

The present invention relates generally to cross-connect assemblies and, in particular, to jack assemblies for digital cross-connect systems.

BACKGROUND OF THE INVENTION

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well known and typically include a plurality of bores sized for receiving tip-and-ring plugs. A plurality of spring contacts are provided within the bores for contacting the tip-and-ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

SUMMARY

One aspect of the present invention relates to a DSX system having modular connector mounts for mounting plug-receiving connectors such as RJ-45 connectors. In certain embodiments, multiple types of interchangeable connector mounts can be used, with each type of connector mount having a different style of connector.

Another aspect of the present invention relates to a jack module sized to occupy only a portion of a telecommunications chassis. The jack module includes a front jack mount, a plurality of jacks and a rear connector mount. The rear connector mount supports a plurality of connectors. The connectors include housings defining ports for receiving plugs. In certain embodiments, the connectors can include RJ-45 connectors.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 8C is a rear, elevational view of the rear support of FIG. 8A;

FIG. 8D is a side, elevational view of the rear support of FIG. 2A;

FIG. 8E is a front, elevational view of the rear support of FIG. 8A;

FIG. 11A is an exploded view of another jack module constructed in accordance with the principles of the present invention;

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
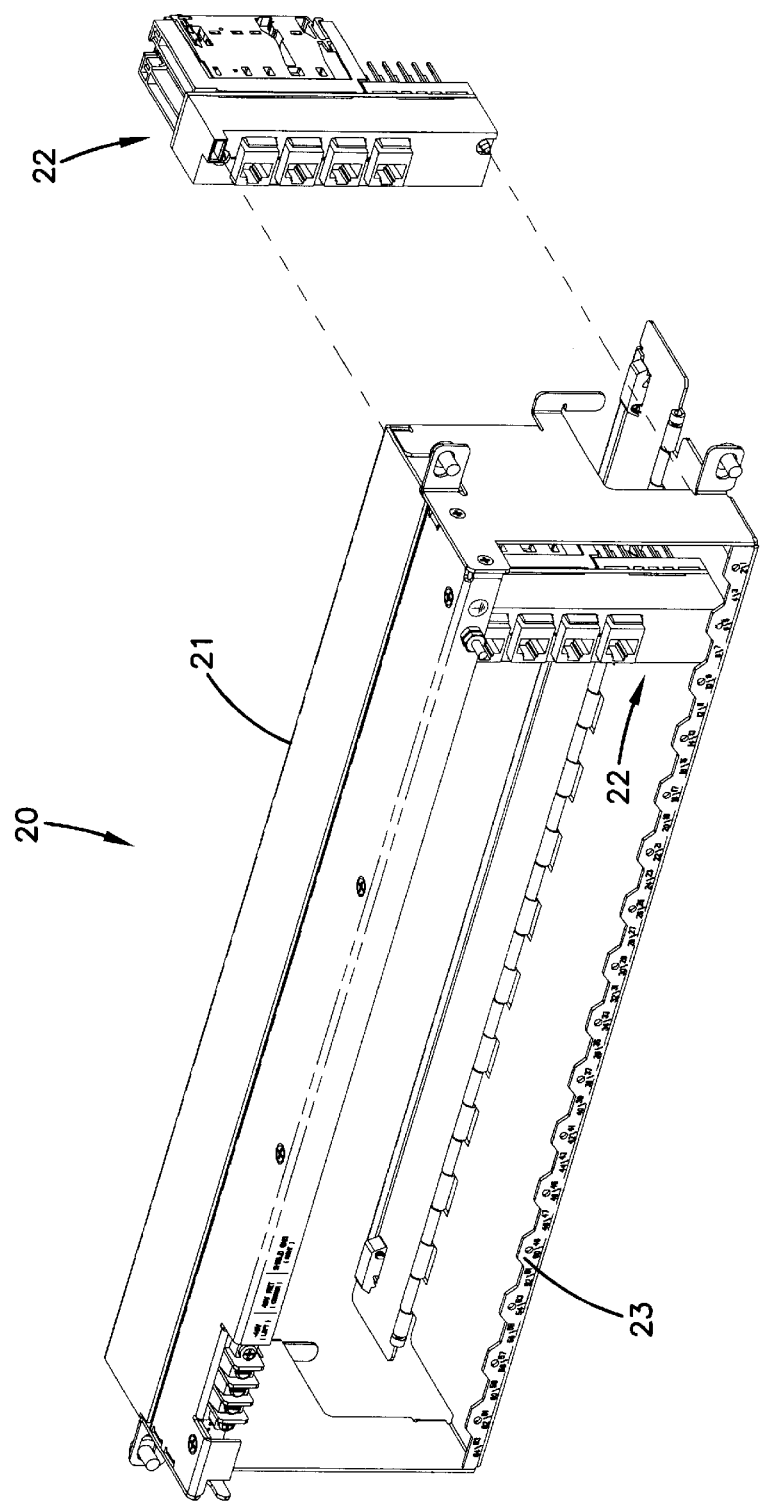
FIG. 1 is a rear, perspective view of a chassis constructed in accordance with the principles of the present invention.

FIG. 1 illustrates an embodiment of a chassis 20 for housing a plurality of removable jack modules 22 constructed in accordance with the principles of the present invention. The chassis 20 includes a front side 21 and a rear side 23. For clarity, only one of the jack modules 22 is shown mounted in the chassis 20, and a second module 22 is shown exploded from the chassis 20. However, it will be appreciated that the chassis 20 is adapted for housing a relatively large number of jack modules 22. For example, to conform with conventional international standards, the chassis 20 can house 16 jack modules 22 and have a length of about 19 inches. Alternatively, in accordance with standard United States specifications, the chassis could be configured to house 21 jack modules and have a length of about 23 inches. Of course, other sizes and other numbers of jack modules could also be used.

Figure 2:
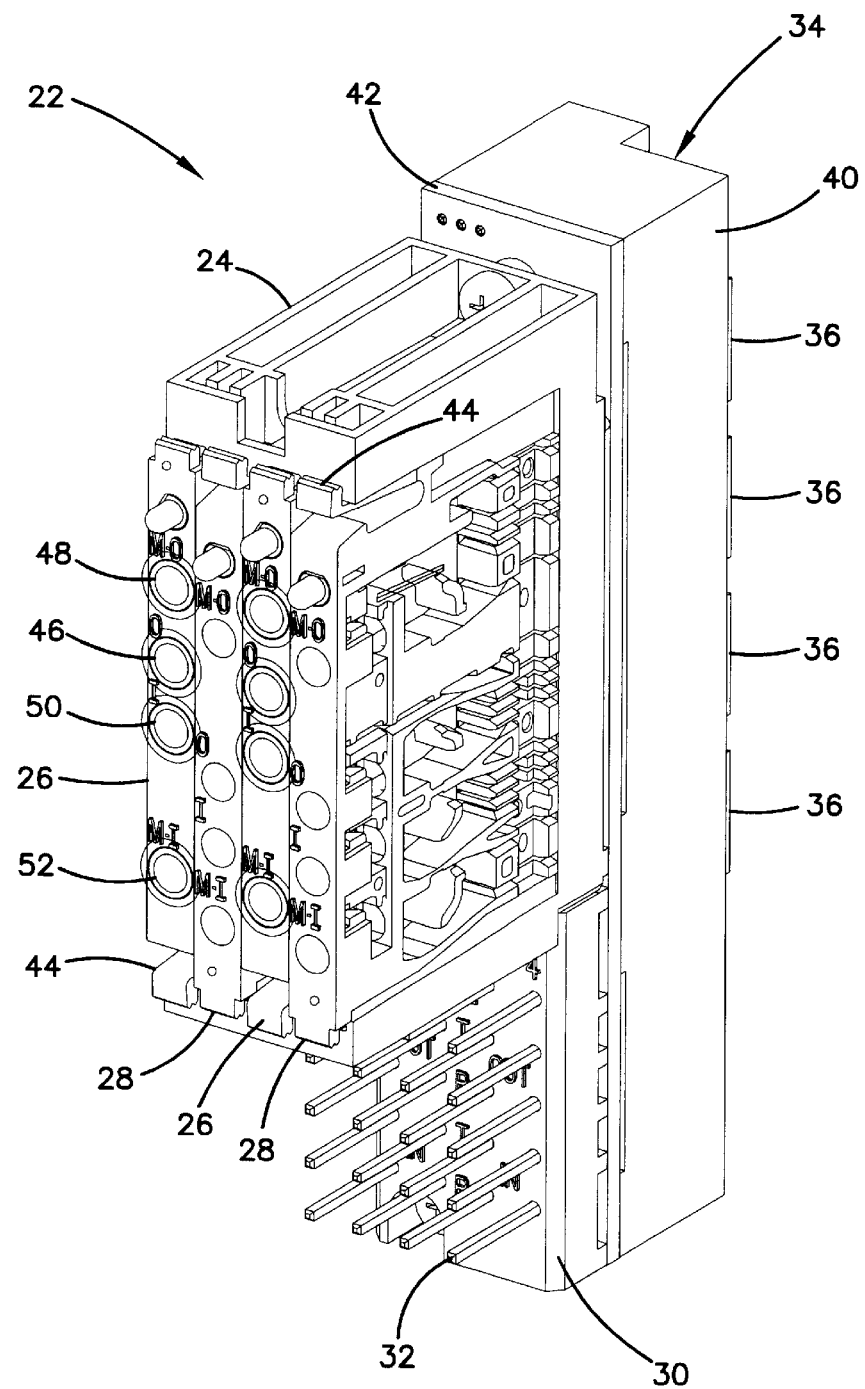
FIG. 2 is a front, perspective view of a jack module constructed in accordance with the principles of the present invention, the jack module is mountable in the chassis of FIG. 1.
Figure 3:
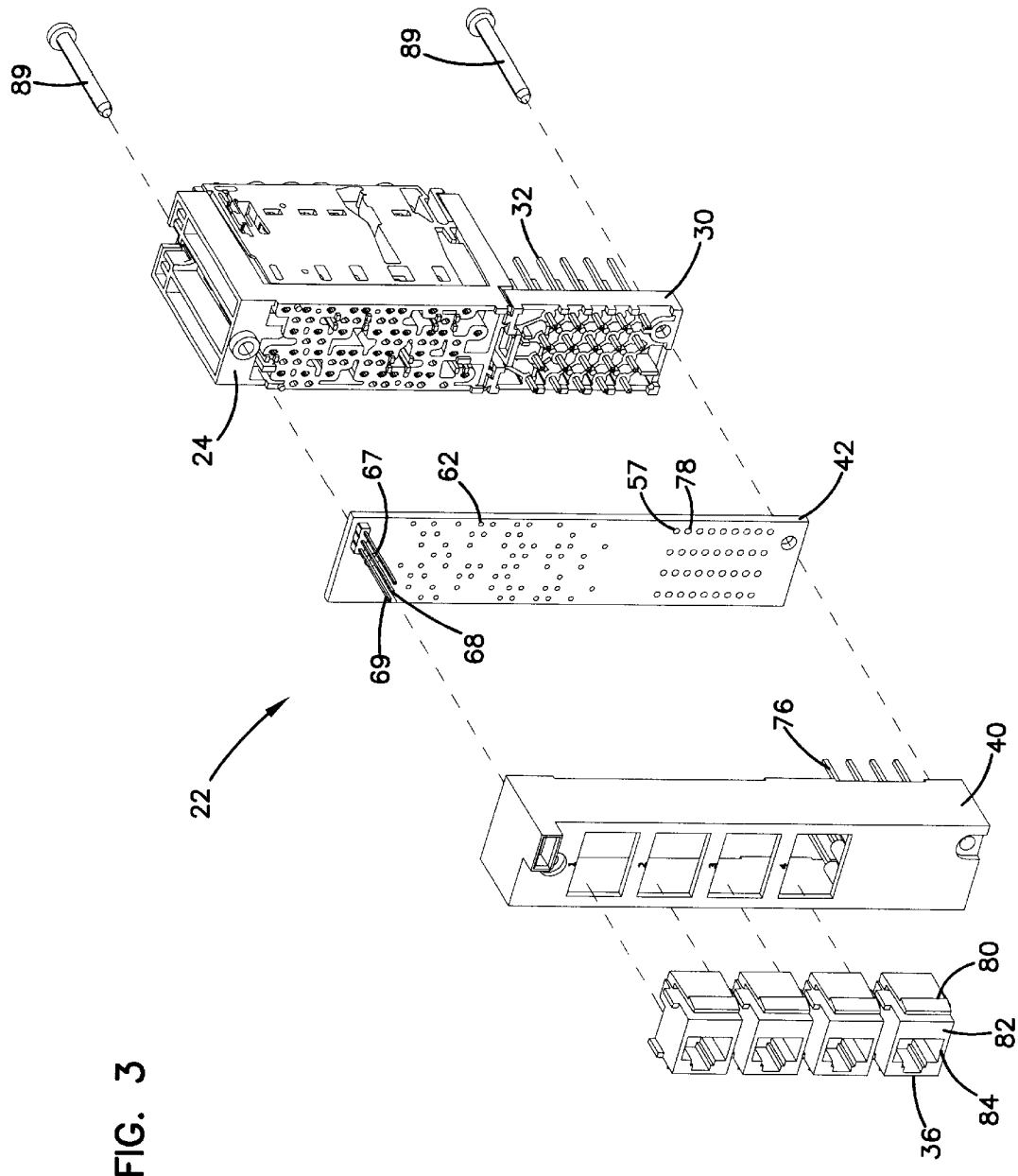
FIG. 3 is a rear, exploded view of the jack module of FIG. 2.

Referring now to FIGS. 2 and 3, one of the jack modules 22 is shown in isolation from the chassis. The jack module 22 includes a jack mount 24 for holding a plurality of jacks (e.g., two odd jacks 26 and two even jacks 28). A cross connect block or panel 30 is mounted below the jack mount 24. The cross-connect panel 30 includes a plurality of cross-connect contacts such as wire wrap pins 32 or other types of contacts/connectors (e.g., insulation displacement connectors). The jack module 22 further includes a rear interface assembly 34 including rearwardly facing connectors 36 such as RJ-45 connectors (best shown in FIG. 3). The connectors 36 are mounted on a rear support 40 (i.e., a rear cover or housing). A circuit board 42 is mounted between the jack mount 24 and the rear support 40. As shown schematically at FIGS. 5 and 6, the circuit board 42 is adapted to provide electrical connections between the jacks 26 and 28, the cross-connect panel 30 and the rear connectors 36.

The jacks 26 and 28 of the jack module 22 are preferably removably mounted in the jack mount 24. For example, the jacks 26 and 28 can be retained within the jack mount 24 by resilient latches 44. By flexing the latches 44, the jacks 26 and 28 can be manually removed from the jack mount 24. When the jacks 26 and 28 are removed from the jack mount 24, the jacks 26 and 28 are electrically disconnected from the circuit board 42. While the jack module 22 is shown as a "four-pack" (i.e., a module including four jacks), it will be appreciated that alternative modules can include jack mounts sized to receive more or fewer than four jacks.

Figure 4:
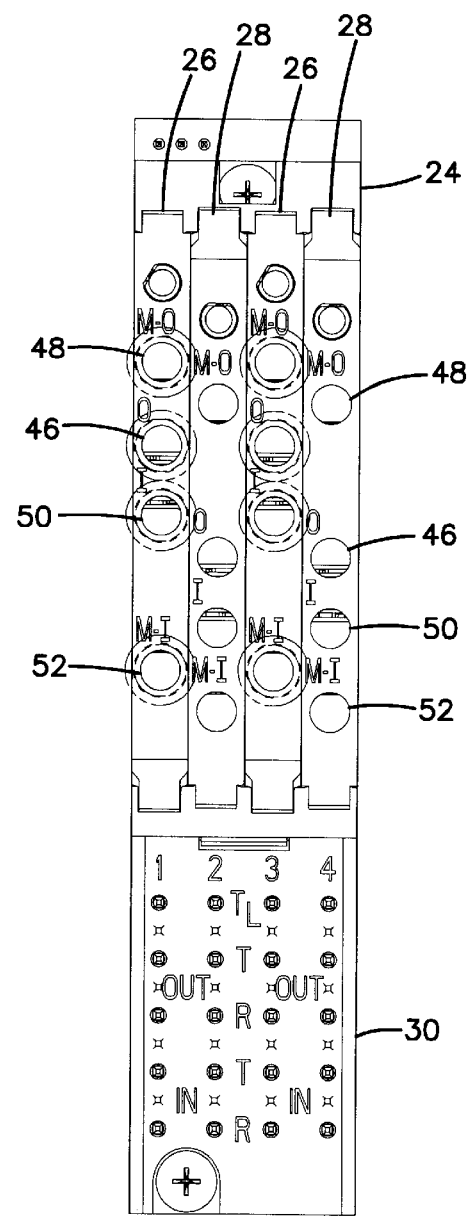
FIG. 4 is a front, elevational view of the jack module of FIG. 2.

As best shown in FIGS. 2 and 4, each of the jacks 26 and 28 includes a front face defining an OUT port 46, a MONITOR OUT port 48, an IN port 50 and a MONITOR IN port 52. When mounted in the jack mount 24, the ports 46–52 of the odd jacks 26 are vertically offset from the respective ports 46–52 of the even jacks 28.

Figure 5:
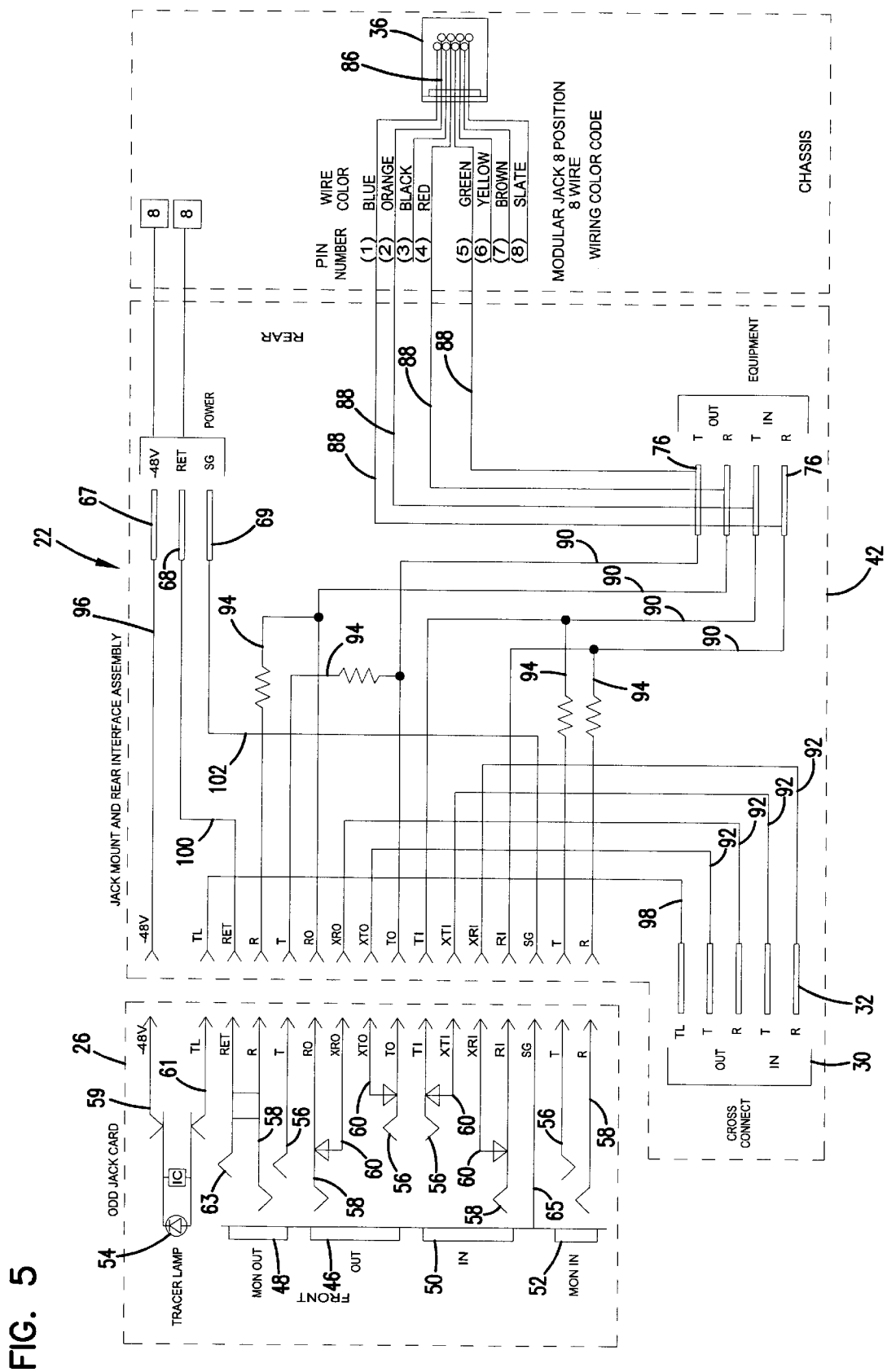
FIG. 5 is a circuit schematic for an odd jack of the jack module of FIG. 2.
Figure 6:
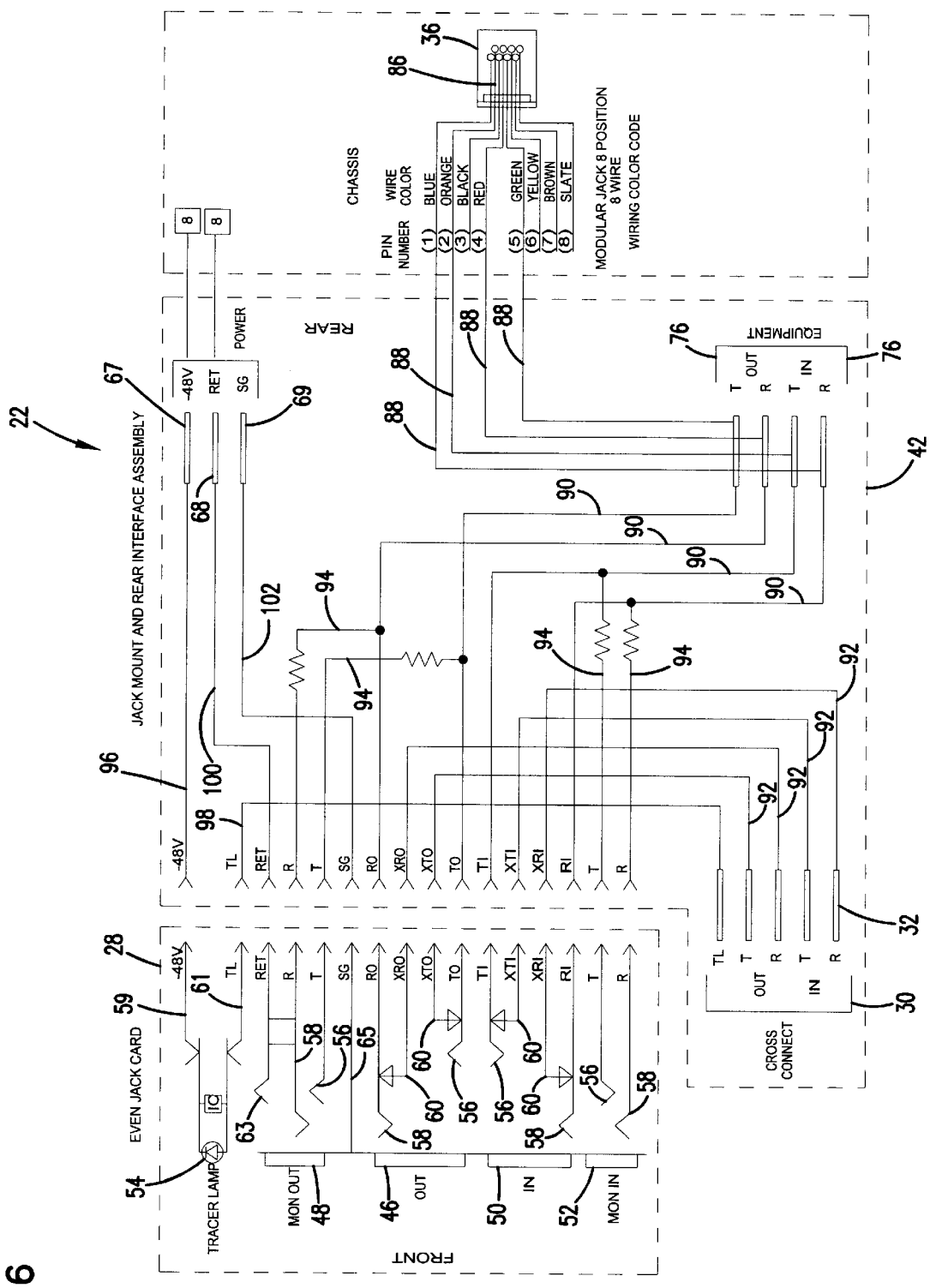
FIG. 6 is a circuit schematic for an even jack of the jack module of FIG. 2.

FIGS. 5 and 6 schematically depict the odd and even jacks 26 and 28. As is evident from FIGS. 5 and 6, the jacks 26 and 28 have identical components arranged in only a slightly different configuration. Thus, for clarity and ease of explanation, similar parts will be assigned the same reference numbers.

Referring to FIGS. 5 and 6, the jacks 26 and 28 include tip and ring springs 56 and 58 corresponding to each of the ports 46–52. The tip and ring springs 56 and 58 of the OUT and IN ports 46 and 50 have corresponding normal springs 60. A tracer lamp circuit 54 is positioned adjacent the top of each of the jacks 26 and 28. Each tracer lamp circuit 54 is electrically connected to a voltage spring 59 and a tracer lamp spring 61. The jacks 26 and 28 further include return ground springs 63 and sleeve ground contacts 65. Additional details about the jacks 26 and 28 can be found in commonly assigned U.S. Pat. No. 6,116,961 that is hereby incorporated by reference in its entirety.

Figure 7:
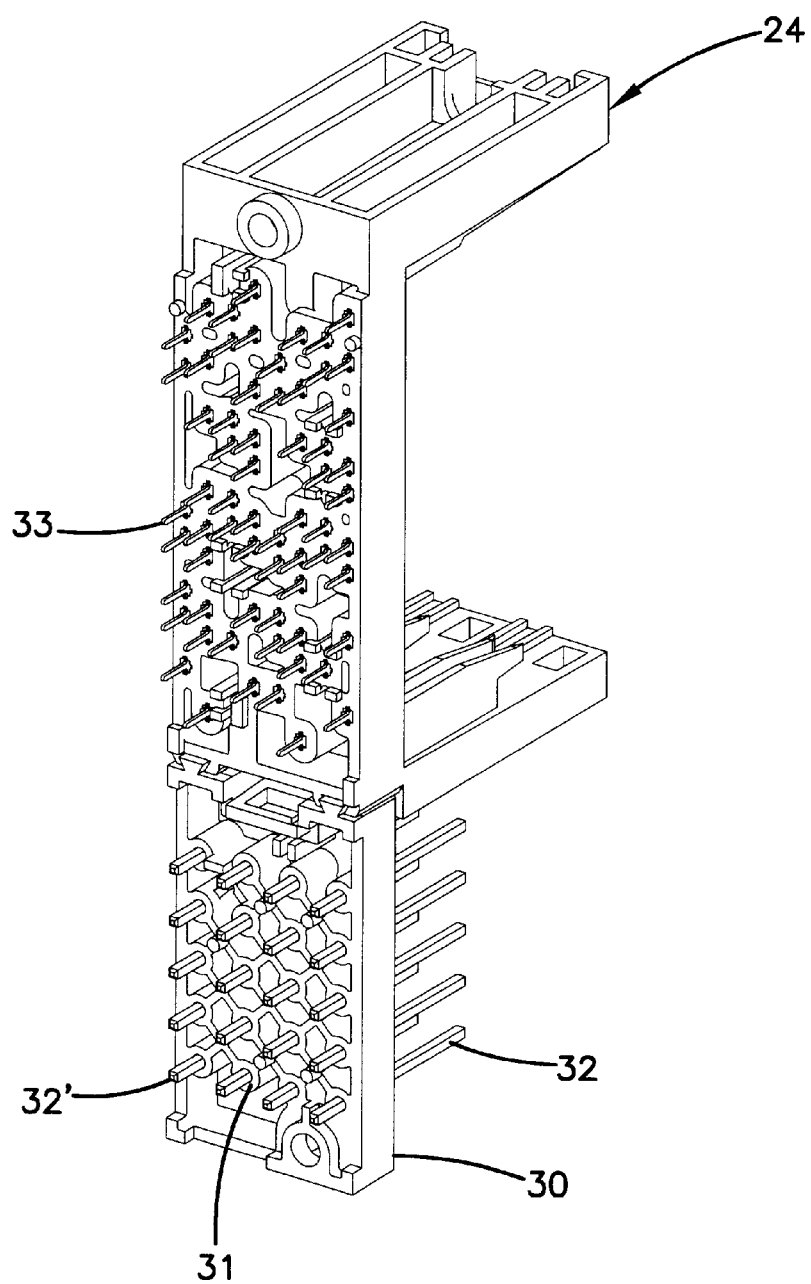
FIG. 7 is a rear, perspective view of a jack mount and cross-connect panel of the jack module of FIG. 2.

Referring to FIG. 7, the cross-connect panel 30 of the jack module 22 preferably includes openings 31 in which the wire wrap pins 32 are press fit. Rear ends 32' of the wire wrap pins 32 preferably project rearwardly through the cross-connect panel 30. Similarly, the jack mount 24 preferably includes a plurality of contacts having pins 33 that project outwardly from the back side of the jack mount 24. The contacts are adapted to provide electrical connections with the jacks 26 and 28 when the jacks are inserted within the jack mount 24. Further details relating to the contacts of the jack mount 24 can be found in U.S. Pat. No. 6,116,961, which was previously incorporated by reference.

Figure 8B:
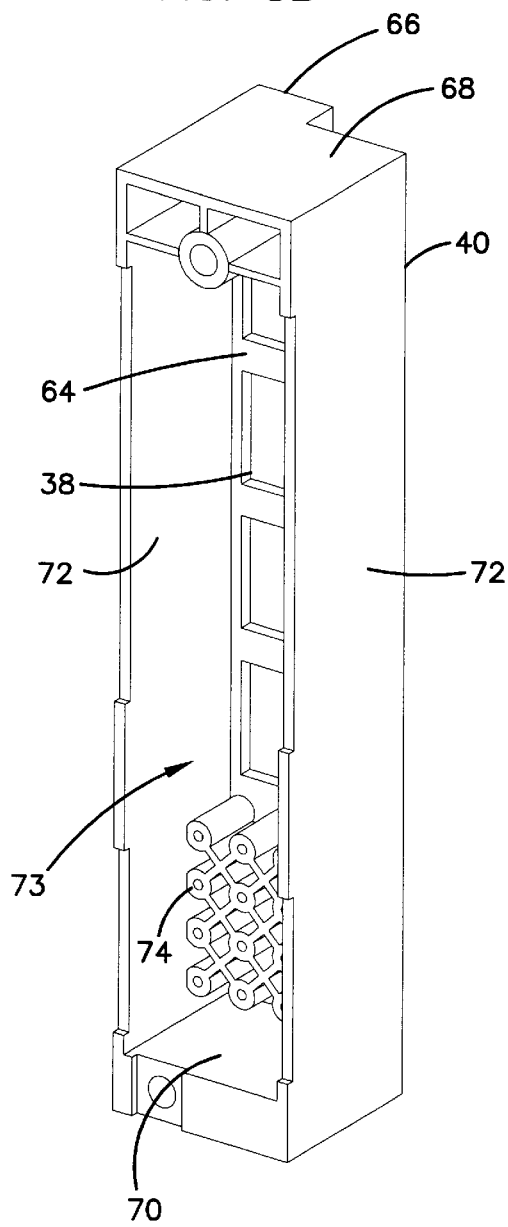
FIG. 8B is a front, perspective view of the rear support of FIG. 8A.
Figure 8A:
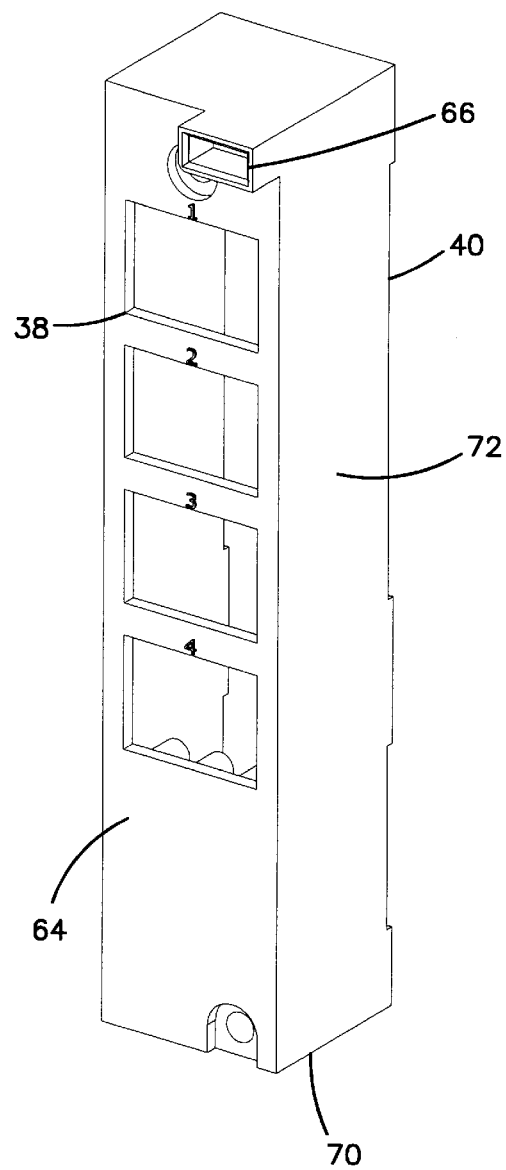
FIG. 8A is a rear, perspective view of a rear support of the jack mount of FIG. 2.

Referring now to FIGS. 8A–8E, the rear support 40 of the rear interface assembly 34 is generally rectangular and is preferably made of a dielectric material such as molded plastic. The rear support 40 includes a connector mount such as a generally planar rear faceplate 64. The rear faceplate 64 defines openings 38 for mounting the connectors 36. Preferably, the openings 38 are generally rectangular and are aligned in a generally vertical column. The rear support 40 also includes top and bottom walls 68 and 70, and side walls 72. As shown in FIG. 8B, the top and bottom walls 68 and 70 and the side walls 72 cooperate to define a chamber 73. It will be appreciated that other connector mount configurations could also be used.

The rear support 40 further includes a plug receptacle 66 that projects outwardly from the rear faceplate 64. The plug receptacle 66 is adapted to house power, return ground and sleeve ground contacts 67, 68 and 69 that are electrically connected to the circuit board 42 (see FIG. 3). The receptacle 66 is sized to receive a conventional power plug for providing power to the jack module 22 for use in illuminating the tracer lamp 54.

Referring to FIGS. 8D and 8E, the front side of the rear faceplate 64 defines a plurality of openings 74. As shown in FIG. 3, a plurality of wire wrap pins 76 are preferably press fit in the openings 74. The wire wrap pins 76 project in a forward direction from the rear faceplate 64.

Figure 9:
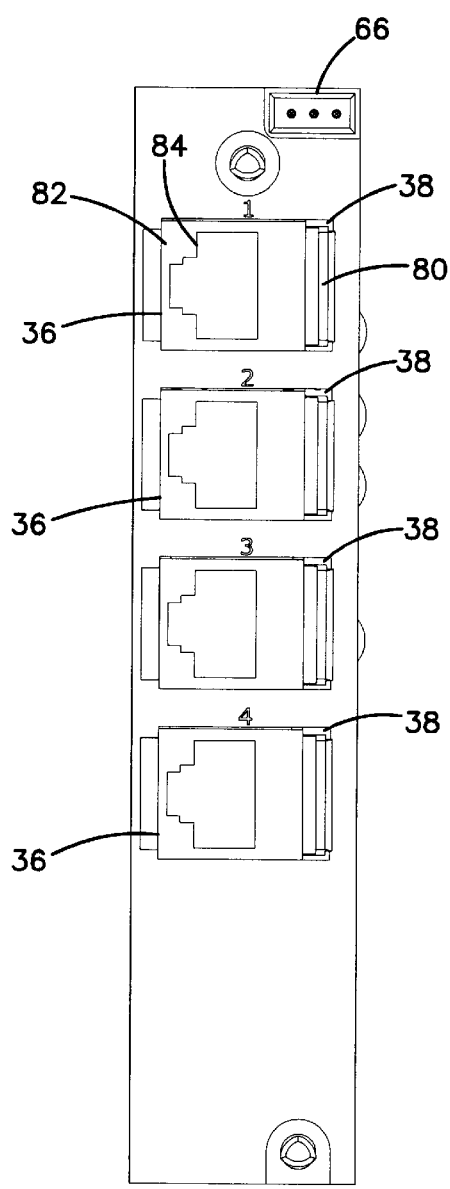
FIG. 9 is a front, elevational view of the jack module of FIG. 2.
Figure 10:
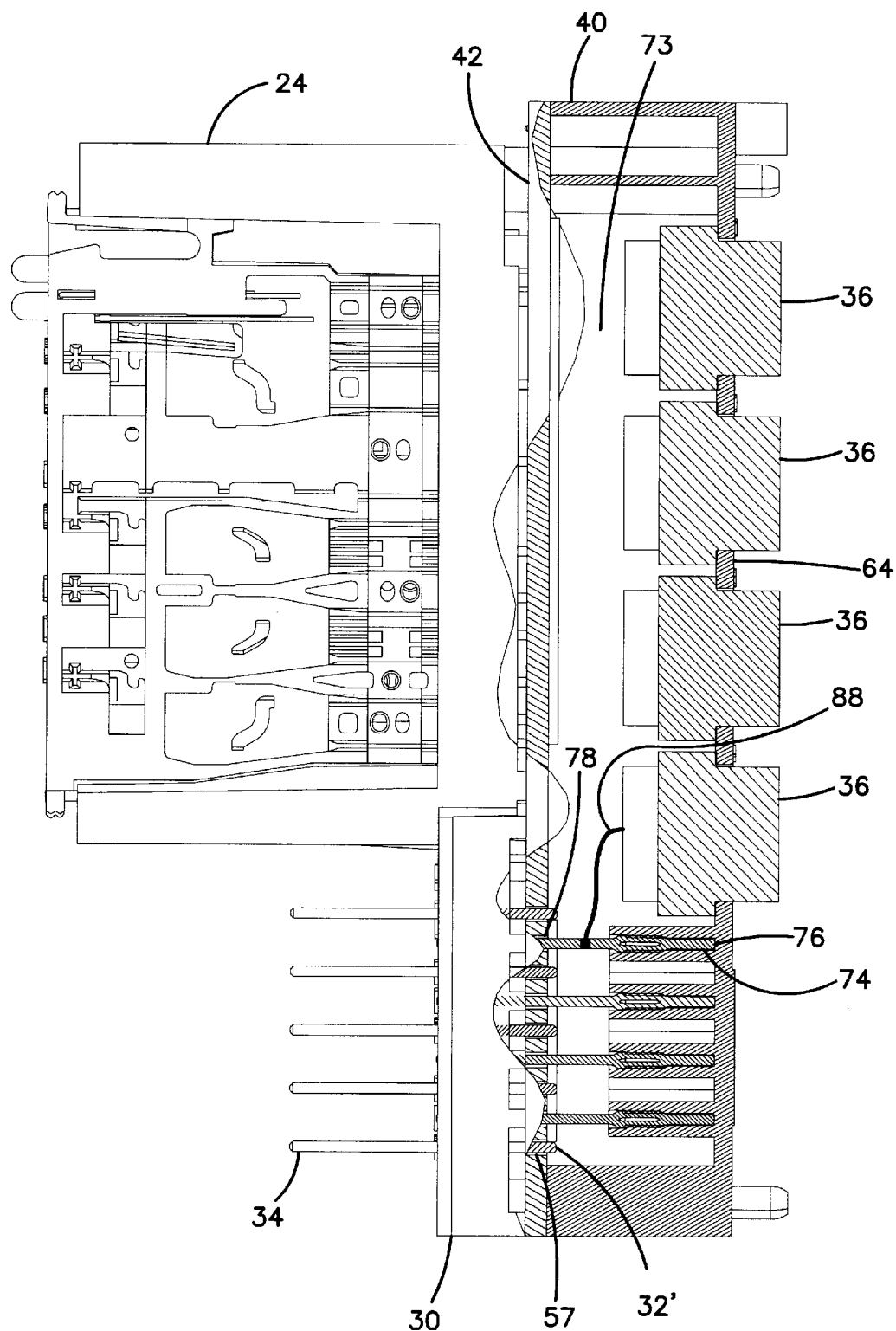
FIG. 10 is a partially cut-away view of the jack module of FIG. 2.

As previously indicated, the openings 38 defined by the rear faceplate 64 are sized to receive the rear connectors 36. As shown in FIGS. 3 and 9, the rear connectors 36 include four RJ-45 connectors having resilient cantilevers 80 for use in snap-fitting the RJ-45 connectors within the openings 38. Each of the RJ-45 connectors includes a dielectric housing 82 defining a receptacle 84 sized for receiving a plug. A plurality of contact springs 86 (shown schematically in FIGS. 5 and 6) are mounted in the receptacle 84. In the case of RJ-45 connectors, the contact springs 86 include eight separate springs. Leads 88 (i.e., wires) are connected to each of the contact springs 86. In FIGS. 5 and 6, the leads 88 of four of the springs 86 (e.g., springs 1, 2, 4 and 5) are shown electrically connected to corresponding wire wrap pins 76 that are press fit within the back side of the rear support 40. The leads 88 are preferably housed in the chamber 73 defined by the rear support 40 (see representative lead 88 in FIG. 10). The other springs (i.e., 3, 6, 7 and 8) are not in use and their corresponding leads are preferably trimmed. It will be appreciated that any four of the springs can be used depending upon an end user's required specification.

While the rear connectors 38 have been shown as RJ-45 connectors, it will be appreciated that other similar types of connectors could also be used. Exemplary similar types of connectors include other types of registered jacks such as RJ-11 connectors, RJ-14 connectors, RJ-21 connectors, RJ-22 connectors as well as other connectors such as DB-9 connectors or other D-sub connectors.

To assemble the jack module 22, the connectors 36 are preferably mounted in the openings 38, and the leads 88 are connected to the wire wrap pins 76 press fit in the rear support 40. The forward ends of the wire wrap pins 76 are then preferably press fit within plated through-holes 78 (shown in FIGS. 3 and 10) defined by a circuit board 42. This provides electrical connections between the wire wrap pins 76 and the circuit board 42, and also mechanically couples the rear support 40 to the circuit board 42. The jack mount 24 and the cross-connect panel 30 are preferably coupled to the circuit board 42 in a similar manner. For example, to electrically and mechanically couple the cross-connect panel 30 to the circuit board 42, the rear ends 32' of the wire wrap pins 32 are preferably press fit within corresponding plated through-holes 57 (shown in FIGS. 3 and 10) defined by the circuit board 42. To electrically and mechanically couple the jack mount 24 to the circuit board 42, the contact pins 33 (shown in FIG. 7, but not FIGS. 3 and 10) are press fit within corresponding plated through-holes 62 (shown in FIG. 3) defined by the circuit board 42. When the jack mount 22 is assembled, the top and bottom walls 68 and 70 and the side walls 72 function to provide an offset between the rear faceplate 64 and the circuit board 42. Also, the leads 88 of the connectors 36 are preferably housed within the chamber 73 of the rear support (see representative lead 88 depicted in FIG. 10). After assembly, the jack module 22 can be connected to the chassis by fasteners 89 (see FIG. 3). In alternative embodiments, rather that connecting the leads 88 to the circuit board 42 by the wire wrap pins 76, the leads 88 could be soldered or otherwise connected directly to the circuit board 42.

Referring now to FIGS. 5 and 6, representative circuitry for the jack module 22 is depicted. As shown in FIGS. 5 and 6, the contact springs 86 of the rear connectors 36 are electrically connected to the wire wrap pins 76 via the leads 88. The wire wrap pins 76 are shown electrically connected to the tip and ring springs 56 and 58 of the OUT and IN ports 46 and 50 by tracings 90 of the circuit board 42. The circuit board 42 also includes tracings 92 that provide electrical connections between the wire wrap pins 32 of the cross connect panel 30 and the normal springs 60 of the jacks 26, 28. Additionally, the circuit board 42 includes tracings 94 for electrically connecting the tip and ring springs 56 and 58 of the MONITOR ports 58 and 52 to the tracings 90. Further, the circuit board 42 includes: tracing 96 for connecting voltage spring 59 to power contact 67; tracing 98 for connecting tracer lamp spring 61 to the cross-connect panel 30; tracing 100 for connecting return ground spring 63 to return ground contact 68; and tracing 102 for connecting sleeve ground contact 65 to sleeve ground contact 69.

In use of the system, two signals (e.g., an IN signal and an OUT signal) can be routed through each jack 26, 28. For example, referring to FIG. 5, the OUT signal can be input to the jack module 22 through springs 4 and 5 of the connector 36, routed through jack 26, and then output from the jack module 22 through the OUT wire wrap pins 32 of the cross-connect panel 30. The IN signal can be input to the jack module 22 through the IN wire wrap pins 32 of the cross-connect panel 30, routed through jack 26, and then output from the module 22 through springs 1 and 2 of the connector 36. To interrupt the IN signal (e.g., for testing purposes), a tip-and-ring plug can be inserted in the IN port 50 causing the IN signal to be routed through the plug. To interrupt the OUT signal (e.g., for testing purposes), a tip-and-ring plug can be inserted in the OUT port 46 causing the OUT signal to be routed through the plug. The OUT and IN signals can be monitored without interruption by inserting tip-and-ring plugs into the respective MONITOR ports 48 and 52.

Figure 11B:
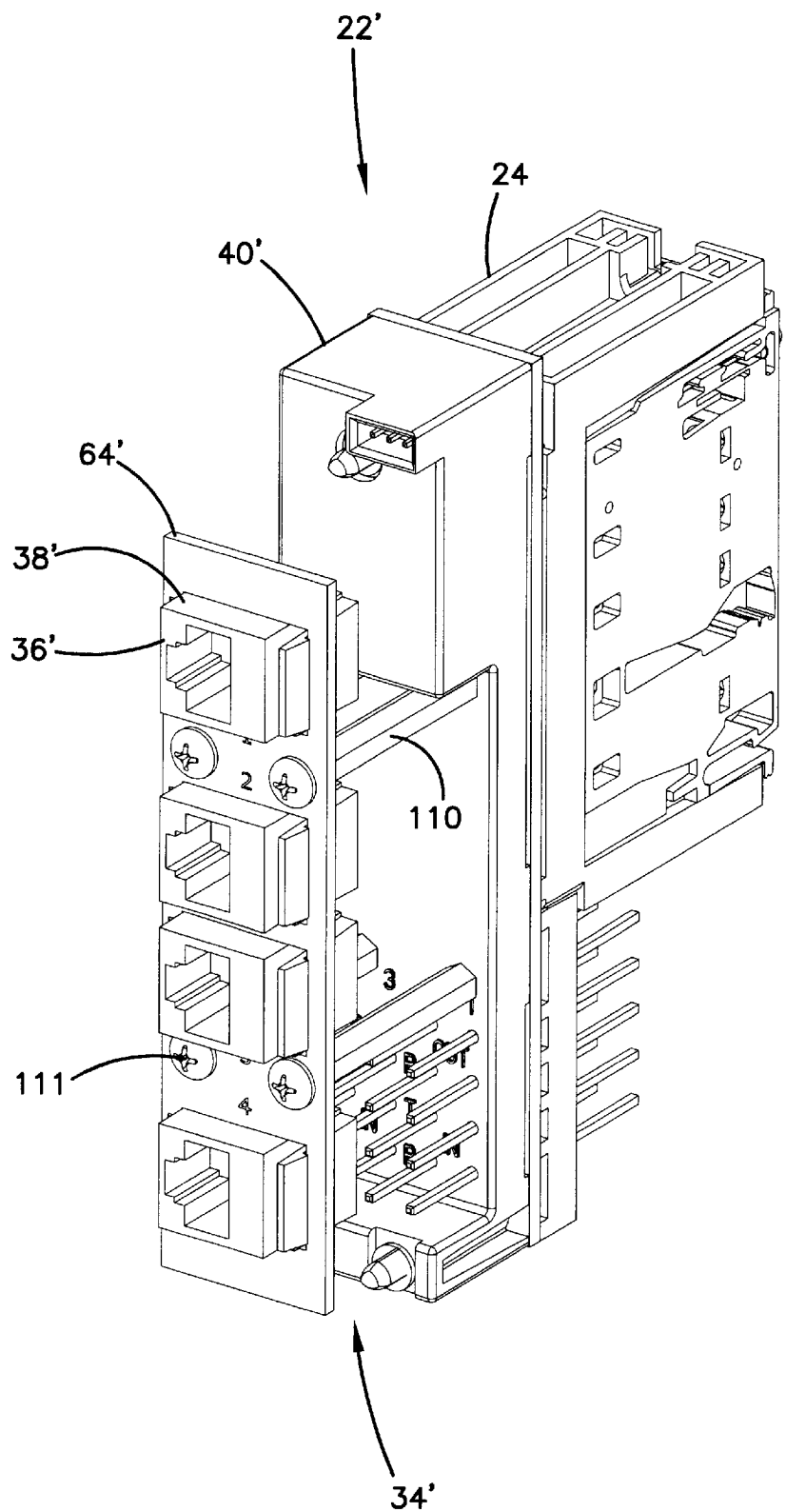
FIG. 11B is an assembled view of the jack module of FIG. 11A.

FIGS. 11A and 11B shows an alternative jack module 22' constructed in accordance with the principles of the present invention. The module 22' includes a modified rear interface assembly 34' connected to the same jack mount 24. The rear interface assembly 34' includes a rear support 40' having press-fit wire wrap pins 76' that project rearwardly from the support 40'. A rear faceplate 64' is connected to the rear support 40' by offset posts 110 and fasteners 111. The face plate 64' defines openings 38' for mounting connectors 36'. Leads of the connectors 36' are preferably connected to the wire wrap pins 76'. The wire wrap pins 76' are preferably electrically connected to jacks 26, 28 of the module 22' in the same manner as the wire wrap pins 76 of the jack module 22.

Figure 12:
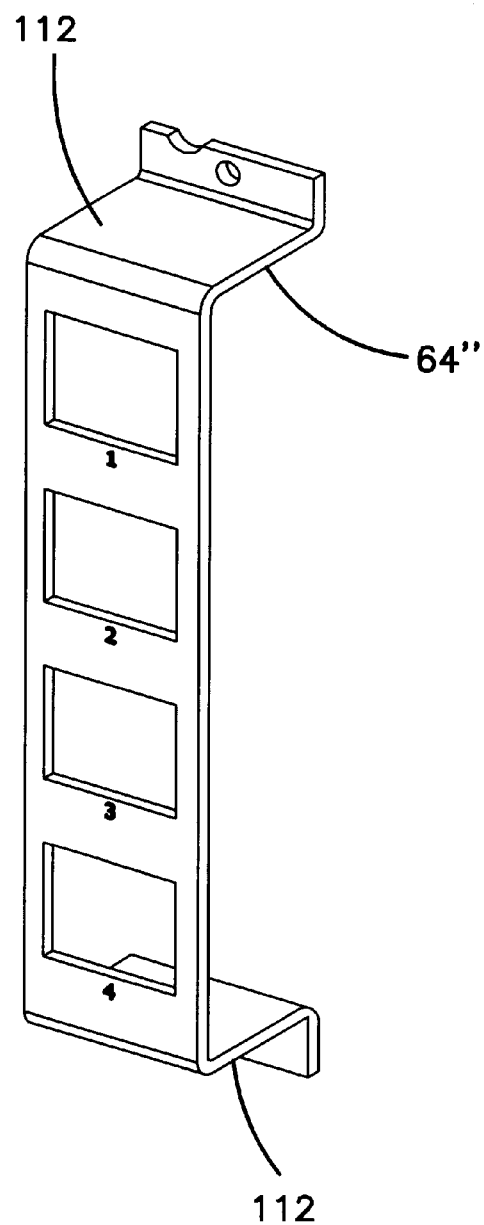
FIG. 12 is a perspective view of an alternative standoff configuration.

FIG. 12 shows a modified faceplate 64" that could be used with the jack module 22'. The faceplate 64" has integral offset legs 112 that eliminate the need for the separate offset posts 110.

Figure 13:
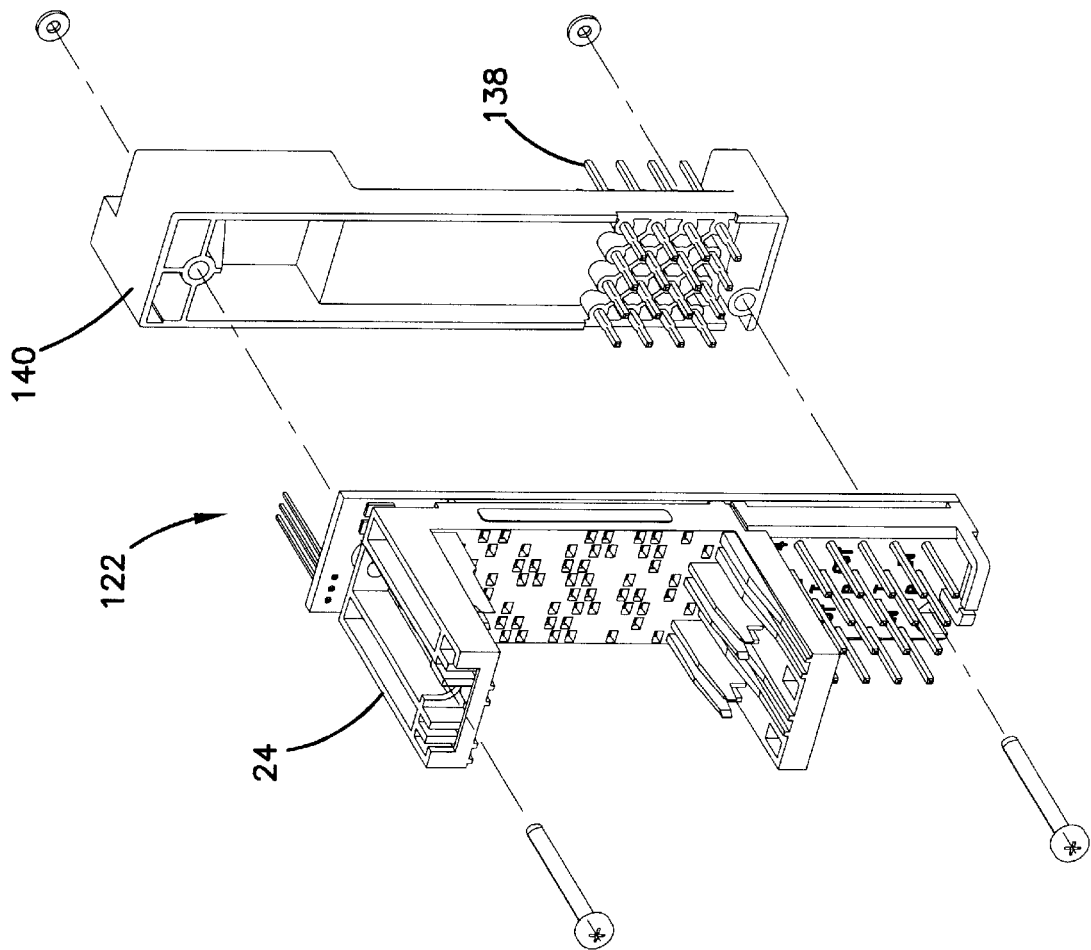
FIG. 13 is an exploded, perspective view of another jack module sized to fit within the chassis of FIG. 1.

FIG. 13 shows a jack module 122 having a rear support 140 with rear connectors 138 in the form of wire wrap pins. The rear support 140 is configured to connect with the same jack mount 24 as the rear support 40 of FIGS. 2 and 3. Also, the jack module 122 is sized to fit in the same chassis 20 (shown in FIG. 1) as the jack module 22.

Figure 14:
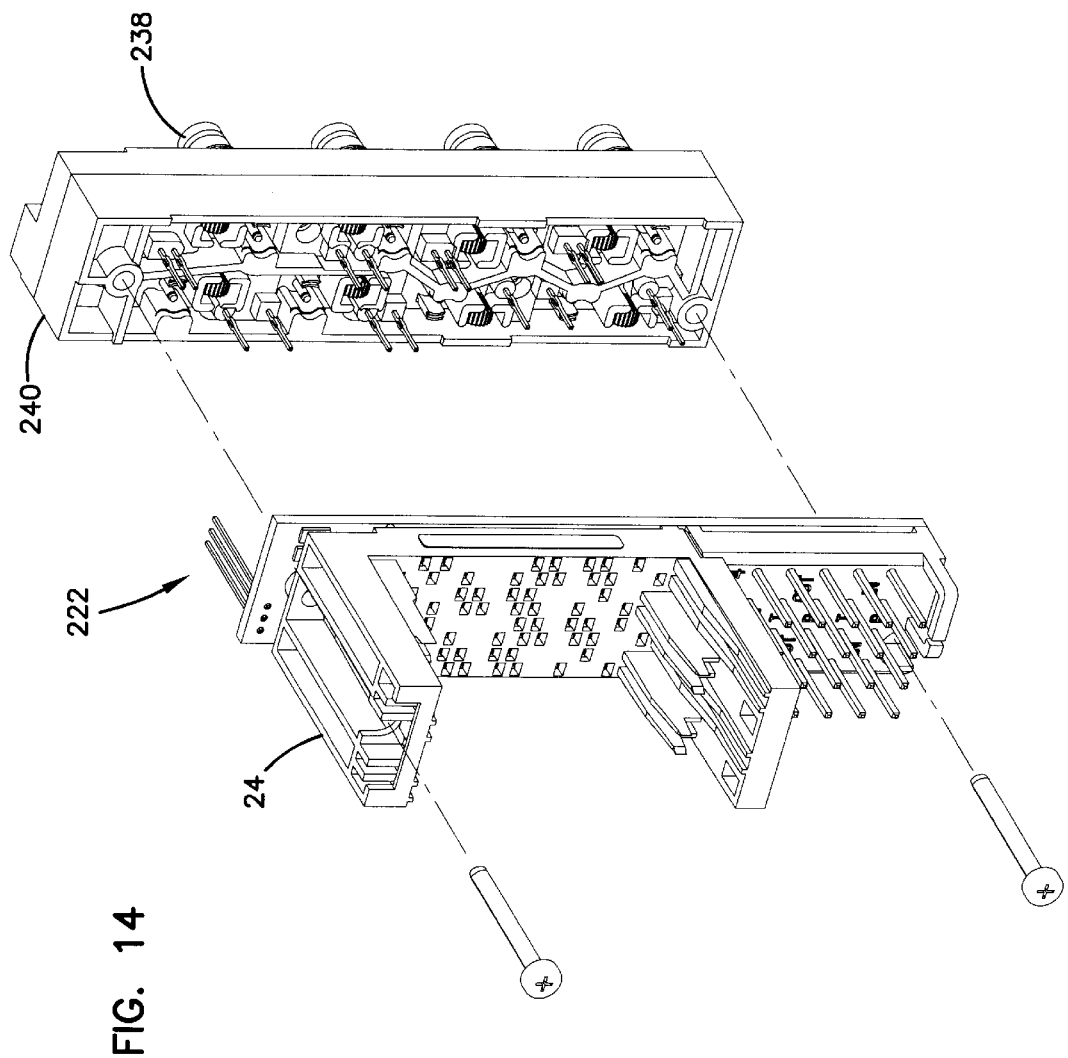
FIG. 14 is an exploded, perspective view of a further jack module adapted to fit within the chassis of FIG. 1.

FIG. 14 shows a jack module 222 having a rear support 240 with rear connectors 238 in the form of coaxial connectors. The rear support 240 is configured to connect with the same jack mount 24 as the rear support 40 of FIGS. 2 and 3. Also, the jack module 222 is sized to fit in the same chassis 20 (shown in FIG. 1) as the jack module 22.

Having described preferred aspects and embodiments of the present invention, modifications and equivalents of the disclosed concepts may readily occur to one skilled in the art. However, it is intended that such modifications and equivalents be included within the scope of the claims which are appended hereto.

We claim:

1. A telecommunications apparatus comprising:
    a chassis sized to fit within a telecommunications rack, the chassis having a front side and a back side;
    a plurality of jacks mounted in the chassis, the jacks including IN and OUT ports accessible from the front of the chassis, the jacks also including tip and ring springs corresponding to each of the IN and OUT ports;
    a plurality of separate rear connector mounts positioned adjacent the back side of the chassis, the separate rear connector mounts being individually removable from the chassis; and
    a plurality of connectors supported by the rear connector mounts, the connectors including housings defining ports for receiving plugs, the connectors also including a plurality of contact springs electrically connected to the tip and ring springs of the jacks.

2. The telecommunications apparatus of claim 1, wherein the connectors include RJ-45 connectors.

3. The telecommunications apparatus of claim 1, wherein each rear connector mount supports only four of the connectors.

4. The telecommunications apparatus of claim 1, wherein each rear connector mount defines a plurality of openings for mounting the connectors, wherein each rear connector mount includes a plurality of wire wrap members that project forwardly from the connector mounts toward the front side of the chassis, and wherein the connectors are electrically connected to the wire wrap members.

5. The telecommunications apparatus of claim 1, wherein each rear connector mount includes a plurality of wire wrap members that project forwardly from the connector mounts toward the front side of the chassis, and wherein the connectors are electrically connected to the wire wrap members.

6. The telecommunications apparatus of claim 5, further comprising a circuit board, wherein forward ends of the wire wrap members are fit within openings defined by the circuit board.

7. The telecommunications apparatus of claim 1, wherein each rear connector mount includes a faceplate defining a plurality of openings for mounting the connectors, wherein each rear connector mount includes a plurality of wire wrap members that project forwardly from the faceplates toward the front side of the chassis, and wherein the connectors are electrically connected to the wire wrap members.

8. The telecommunications apparatus of claim 7, wherein the wire wrap members are press fit within openings defined by the rear connector mounts.

9. The telecommunications apparatus of claim 8, wherein the openings do not extend completely through the rear connector mounts.

10. The telecommunications apparatus of claim 7, wherein the connectors are electrically connected to the wire wrap members by leads, and wherein the leads are located within chambers defined by the rear connector mounts.

11. The telecommunications apparatus of claim 10, wherein the rear connector mounts include opposing side walls and opposing top and bottom walls that cooperate to define the chambers.

12. The telecommunications apparatus of claim 1, further comprising separate dielectric supports corresponding to each of the rear connector mounts, the dielectric supports including wire wrap members that project rearwardly from the dielectric supports toward the rear connector mounts, the connectors being electrically connected to the wire wrap members.

13. The telecommunications apparatus of claim 12, further comprising offset members for offsetting the rear connector mounts from the dielectric supports.

14. The telecommunications apparatus of claim 13, wherein the offset members include posts.

15. The telecommunications apparatus of claim 13, wherein the offset members include legs integral with the rear connector mounts.

16. A telecommunications system comprising:
   a chassis sized to fit within a telecommunications rack, the chassis having a front side and a back side;
   a plurality of jacks mounted in the chassis, the jacks including IN and OUT ports accessible from the front of the chassis, the jacks also including tip and ring springs corresponding to each of the IN and OUT ports;
   first, second and third separate rear connector mounts positionable adjacent the back side of the chassis;
   a plurality of first connectors supported by the first rear connector mounts, the first connectors including housings defining ports for receiving plugs, the first connectors also including a plurality of contact springs,
   a plurality of wire wrap members supported by the second rear connector mounts; and
   a plurality of coaxial connectors supported by the third rear connector mounts.

17. The telecommunications system of claim 16, wherein the first connectors include RJ-45 connectors.

18. A telecommunications apparatus comprising:
   a jack module sized to occupy only a portion of a telecommunications chassis, the jack module comprising:
   a front jack mount;
   a plurality of jacks mounted in the jack mount, the jacks including IN and OUT ports accessible from the front of the chassis, the jacks also including tip and ring springs corresponding to each of the IN and OUT ports;
   a rear connector mount; and
   a plurality of connectors supported by the rear connector mount, the connectors including housings defining ports for receiving plugs, the connectors also including a plurality of contact springs electrically connected to the tip and ring springs of the jacks.

19. The telecommunications apparatus of claim 18, wherein no more than 12 of the connectors are supported by the connector mount.

20. The telecommunications apparatus of claim 18, wherein the connectors include RJ-45 connectors.

21. The telecommunications apparatus of claim 19, wherein the rear connector mount supports only four of the connectors.

22. The telecommunications apparatus of claim 18, wherein the rear connector mount defines a plurality of openings for mounting the connectors, wherein the rear connector mount includes a plurality of wire wrap members that project forwardly from the connector mount toward the jack mount, and wherein the connectors are electrically connected to the wire wrap members.

23. The telecommunications apparatus of claim 18, wherein the rear connector mount includes a plurality of wire wrap members that project forwardly from the connector mounts toward the front side of the chassis, and wherein the connectors are electrically connected to the wire wrap members.

24. The telecommunications apparatus of claim 23, further comprising a circuit board, wherein forward ends of the wire wrap members are fit within openings defined by the circuit board.

25. The telecommunications apparatus of claim 18, wherein the rear connector mount includes a faceplate defining a plurality of openings for mounting the connectors, wherein the rear connector mount includes a plurality of wire wrap members that project forwardly from the faceplates toward the jack mount, and wherein the connectors are electrically connected to the wire wrap members.

26. The telecommunications apparatus of claim 25, wherein the wire wrap members are press fit within openings defined by the rear connector mount.

27. The telecommunications apparatus of claim 26, wherein the openings do not extend completely through the rear connector mount.

28. The telecommunications apparatus of claim 25, wherein the connectors are electrically connected to the wire wrap members by leads, and wherein the leads are located within a chamber defined by the rear connector mount.

29. The telecommunications apparatus of claim 28, wherein the rear connector mount includes opposing side walls and opposing top and bottom walls that cooperate to define the chamber.

30. The telecommunications apparatus of claim 18, further comprising a dielectric support positioned between the jack mount and the rear connector mount, the dielectric supports including wire wrap members that project rearwardly from the dielectric supports toward the rear connector mount, the connectors being electrically connected to the wire wrap members.

31. The telecommunications apparatus of claim 30, further comprising offset members for offsetting the rear connector mount from the dielectric support.

32. The telecommunications apparatus of claim 31, wherein the offset members include posts.

33. The telecommunications apparatus of claim 31, wherein the offset members include legs integral with the rear connector mount.

34. A telecommunications apparatus comprising:
   a jack module sized to occupy only a portion of a telecommunications chassis, the jack module comprising:
   a front jack mount;
   a plurality of jacks mounted in the jack mount, the jacks including IN and OUT ports accessible from the front of the chassis, the jacks also including tip and ring springs corresponding to each of the IN and OUT ports;
   a rear connector mount coupled to the front jack mount such that the front jack mount and the rear connector mount can be removed from the chassis as a unit;
   a plurality of connectors supported by the rear connector mount, the connectors being arranged in a column, the connectors including plastic housings defining ports for receiving plugs, the connectors also including a plurality of contact springs;
   an array of termination members mounted to the rear connector mount at a location below the column of connectors, the termination members projecting forwardly from the connector mount;
   a circuit board positioned between the front jack mount and the rear connector mount, the termination members being terminated in the circuit board, the circuit board having tracings that electrically connect the termination members to the tip and ring springs of the jacks; and wires that electrically connect the contact springs of the connectors to the termination members, the wires being terminated to the termination members at locations positioned between the rear connector mount and the circuit board.

35. A telecommunications apparatus comprising:

a jack module sized to occupy only a portion of a telecommunications chassis, the jack module including a front and a back, the jack module comprising:

a front jack mount;

a plurality of jacks mounted in the jack mount, the jacks including IN and OUT ports accessible from the front of the jack module, the jacks also including tip and ring springs corresponding to each of the IN and OUT ports;

a rear dielectric piece;

a circuit board positioned between the rear dielectric piece and the front jack mount;

front termination members terminated to the circuit board that are accessible from the front of the jack module;

rear termination members terminated to the circuit board, the rear termination members being supported by the rear dielectric piece and including portions that project rearwardly from the rear dielectric piece;

connectors electrically connected to the rear termination members, the connectors being positioned behind the rear dielectric piece, the connectors including housings defining ports for receiving plugs; and the front jack mount, the circuit board, the rear dielectric piece and the connectors being mechanically couple together so as to be removable from the chassis as a module unit.

36. The apparatus of claim 35, wherein the jack module includes only four of the connectors.

37. The apparatus of claim 35, wherein the jack includes do not extend completely through the rear connector mounts.

* * * * *

UNITED STATES PATENT AND TRADEMARK OFFICE
CERTIFICATE OF CORRECTION

PATENT NO. : 6,626,705 B2
DATED : September 30, 2003
INVENTOR(S) : Perrone et al.

It is certified that error appears in the above-identified patent and that said Letters Patent is hereby corrected as shown below:

Column 7,
Line 25, "contact springs," should read -- contact springs; --

Column 10,
Line 11, "mechanically couple together" should read -- mechanically coupled together --
Line 17, "claim 35, wherein the jack includes" should read -- claim 8, wherein the wire wrap members --

Signed and Sealed this

Twenty-seventh Day of July, 2004

JON W. DUDAS
*Acting Director of the United States Patent and Trademark Office*